United States Patent
Riley et al.

(10) Patent No.: US 10,508,430 B2
(45) Date of Patent: Dec. 17, 2019

(54) STORMWATER DRAIN INSERTS

(71) Applicant: New Pig Corporation, Tipton, PA (US)

(72) Inventors: Matthew James Riley, Hollidaysburg, PA (US); Daniel J. Gongloff, Ashville, PA (US); Evan L. Biesinger, Claysburg, PA (US)

(73) Assignee: New Pig Corporation, Tipton, PA (US)

( * ) Notice: Subject to any disclaimer, the term of this patent is extended or adjusted under 35 U.S.C. 154(b) by 8 days.

(21) Appl. No.: 15/935,175

(22) Filed: Mar. 26, 2018

(65) Prior Publication Data
US 2019/0292766 A1 Sep. 26, 2019

(51) Int. Cl.
| | |
|---|---|
| *E03F 5/04* | (2006.01) |
| *E03F 5/16* | (2006.01) |
| *C02F 1/00* | (2006.01) |
| *C02F 1/28* | (2006.01) |
| *B01D 29/27* | (2006.01) |
| *E03F 5/14* | (2006.01) |
| *B01D 15/00* | (2006.01) |
| *B01D 29/23* | (2006.01) |
| *C02F 103/00* | (2006.01) |
| *C02F 101/32* | (2006.01) |
| *C02F 101/20* | (2006.01) |

(52) U.S. Cl.
CPC ............. *E03F 5/16* (2013.01); *B01D 15/00* (2013.01); *B01D 29/23* (2013.01); *B01D 29/27* (2013.01); *C02F 1/004* (2013.01); *C02F 1/285* (2013.01); *E03F 5/0404* (2013.01); *E03F 5/14* (2013.01); *B01D 2201/48* (2013.01); *C02F 2101/20* (2013.01); *C02F 2101/32* (2013.01); *C02F 2103/001* (2013.01)

(58) Field of Classification Search
CPC .. E03F 5/0404; E03F 5/14; E03F 5/16; B01D 29/27; B01D 2201/0415; C02F 2103/001
USPC .......... 210/163, 164, 170.03, 474, 478, 479, 210/480, 747.3
See application file for complete search history.

(56) References Cited

U.S. PATENT DOCUMENTS

| | | | |
|---|---|---|---|
| 5,252,211 A * | 10/1993 | Searfoss, Jr. | ........... A47J 31/06 210/474 |
| 5,297,367 A | 3/1994 | Sainz | |
| 5,372,714 A | 12/1994 | Logue, Jr. | |

(Continued)

FOREIGN PATENT DOCUMENTS

WO   8803201   5/1988

*Primary Examiner* — Christopher Upton
(74) *Attorney, Agent, or Firm* — Alan G. Towner; Leech Tishman Fuscaldo & Lampl

(57) ABSTRACT

Stormwater drain inserts that reduce or eliminate environmental runoff during rain storms and the like are described. The stormwater drain inserts are water permeable, but capture sediment, hydrocarbons, heavy metals and other contaminants. The stormwater drain inserts are adjustable in size in order to fit into various sizes of storm drain chambers, resting on the lip between the top grate and the chamber. The stormwater drain inserts include a top bib with a central sediment bag extending downward therefrom. Overflow ports are provided in the sediment bag, and an inwardly extending overhang ring directs incoming water flow away from the overflow ports as it enters the sediment bag. The top bib, sediment bag and overhang ring may be made of water permeable oleniphilic fabric that helps trap oils and other hydrocarbons.

13 Claims, 6 Drawing Sheets

(56) References Cited

U.S. PATENT DOCUMENTS

| | | | | |
|---|---|---|---|---|
| 5,575,925 | A | 11/1996 | Logue, Jr. | |
| 5,679,246 | A | 10/1997 | Wilcox et al. | |
| 5,744,048 | A | 4/1998 | Stetler | |
| 6,045,691 | A | 4/2000 | McDermott | |
| 6,086,758 | A * | 7/2000 | Schilling | E03F 5/0404 210/164 |
| 6,149,803 | A | 11/2000 | DiLoreto, Jr. et al. | |
| 6,200,484 | B1 | 3/2001 | McInnis | |
| 6,214,216 | B1 * | 4/2001 | Isaacson | E03F 5/0404 210/163 |
| 6,294,095 | B1 | 9/2001 | Lewis | |
| 6,517,709 | B1 | 2/2003 | Cardwell et al. | |
| 6,632,501 | B2 | 10/2003 | Brownstein et al. | |
| 6,666,974 | B2 | 12/2003 | Page | |
| 6,805,804 | B2 | 10/2004 | Page | |
| 6,869,526 | B2 | 3/2005 | Sharpless | |
| 7,070,691 | B2 * | 7/2006 | Lindemulder | E03F 5/0404 210/164 |
| 7,186,333 | B2 | 3/2007 | Kluge | |
| 7,201,843 | B2 * | 4/2007 | Sasaki | E03F 5/0404 210/164 |
| 7,404,892 | B2 | 7/2008 | Shaw et al. | |
| 7,479,221 | B2 | 1/2009 | Paoluccio et al. | |
| 7,658,857 | B2 | 2/2010 | Wacome | |
| 7,771,591 | B2 | 8/2010 | Lucas | |
| 7,981,300 | B2 | 7/2011 | Wacome | |
| 8,168,064 | B2 | 5/2012 | Peters, Jr. et al. | |
| 8,221,632 | B2 | 7/2012 | McInnis et al. | |
| 8,438,731 | B2 | 5/2013 | Peters, Jr. et al. | |
| 8,608,956 | B2 | 12/2013 | Moulton et al. | |
| 8,652,323 | B2 | 2/2014 | Dorsey | |
| 8,715,491 | B2 | 5/2014 | Shaw et al. | |
| 8,980,084 | B2 | 3/2015 | Dorsey | |
| 9,051,192 | B2 | 6/2015 | Kent | |
| 9,194,116 | B2 | 11/2015 | Bailey et al. | |
| 9,322,156 | B2 | 4/2016 | McInnis et al. | |
| 2002/0020658 | A1 | 2/2002 | Isaacson | |
| 2002/0104789 | A1 * | 8/2002 | Harris | E03F 5/0404 210/162 |
| 2002/0113025 | A1 | 8/2002 | Gauldin et al. | |
| 2004/0011731 | A1 | 1/2004 | Sanguinetti | |
| 2006/0260996 | A1 | 11/2006 | Brownstein et al. | |
| 2008/0290042 | A1 | 11/2008 | Hanson et al. | |
| 2012/0222995 | A1 * | 9/2012 | Sasaki | E03F 5/0404 210/163 |
| 2013/0056399 | A1 | 3/2013 | Downare | |
| 2013/0186811 | A1 | 7/2013 | Kaiser | |
| 2013/0292317 | A1 | 11/2013 | Shaw et al. | |
| 2013/0299402 | A1 * | 11/2013 | Rogahn | E03F 5/0404 210/163 |
| 2014/0064840 | A1 * | 3/2014 | McInnis | E03F 5/0404 403/374.3 |
| 2014/0332452 | A1 | 11/2014 | Wacome | |
| 2017/0145677 | A1 * | 5/2017 | Coppola | E03F 5/0404 |

\* cited by examiner

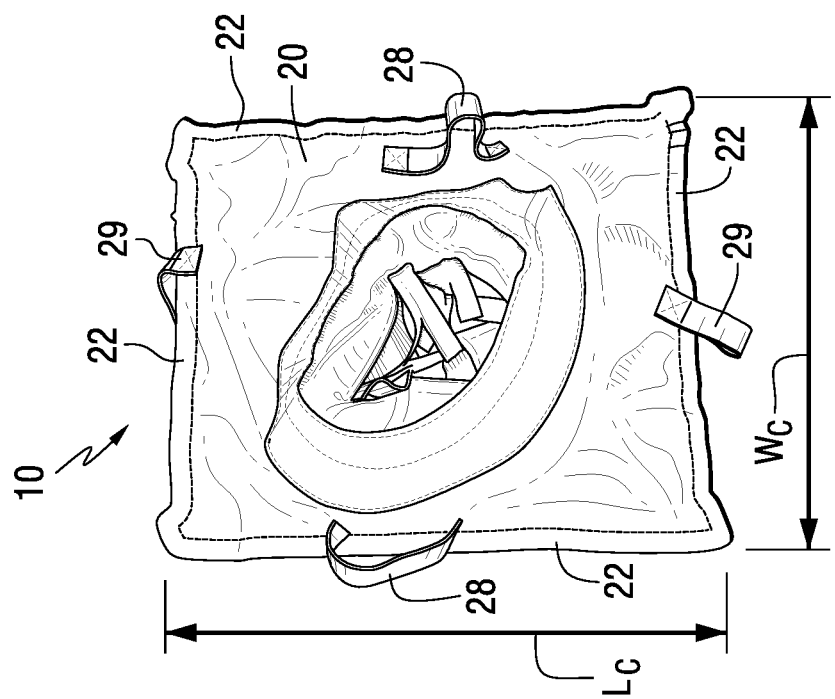
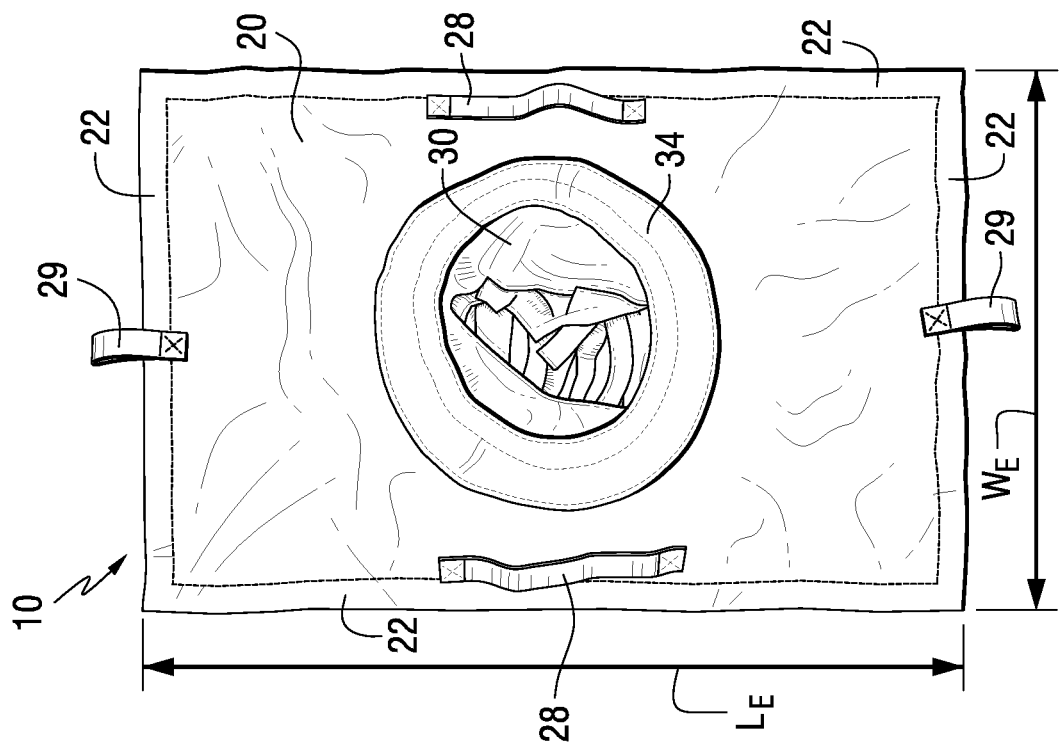

STORMWATER DRAIN INSERTS

FIELD OF THE INVENTION

The present invention relates to stormwater drain inserts that are adjustable in size and are designed to handle overflow conditions.

BACKGROUND INFORMATION

Certain types of conventional stormwater drain inserts include a layer of water permeable fabric that captures sediment and other contaminants, but allows water to pass through the fabric. In some designs, a central sediment bag extends downwardly from a flat layer of the water permeable fabric. The stormwater drain inserts may be held in place within a storm chamber by the weight of a storm drain grate that presses around the periphery of the fabric layer. Braces may optionally be inserted through loops at edges of the fabric for additional stability. Slits or openings are provided at the outer edges or corners of the filter fabric to accommodate such braces. However, such slits and openings can allow untreated stormwater runoff to pass through.

In round stormwater drains, a circular metal rod may be located at a circular top edge of a sediment bag for added stability. Such rods define a specific chamber opening diameter and cannot be adjusted for different size chambers.

SUMMARY OF THE INVENTION

The present invention provides stormwater drain inserts that reduce or eliminate environmental runoff during rain storms and the like. The stormwater drain inserts are water permeable, but capture sediment, hydrocarbons, heavy metals and other contaminants. The stormwater drain inserts are adjustable in size in order to fit into various sizes of storm drain chambers, resting on the lip between the top grate and the chamber. The stormwater drain inserts include a top bib with a central sediment bag extending downward therefrom. Overflow ports are provided in the sediment bag, and an inwardly extending overhang ring directs incoming water flow away from the overflow ports as it enters the sediment bag. The top bib, sediment bag and overhang ring may be made of water permeable oleophilic fabric that helps trap oils and other hydrocarbons.

An aspect of the present invention is to provide a stormwater drain insert comprising: a peripheral frame; a top bib comprising water permeable fabric, an outer peripheral edge supported by the peripheral frame, and an opening inside the peripheral frame; a sediment bag comprising water permeable fabric extending downward from the top bib and having a top rim adjacent to the opening of the top bib; an overhanging ring extending from the top bib laterally inward from the top rim of the sediment bag defining an overhang distance; and at least one overflow port in a sidewall of the sediment bag located vertically below the overhanging ring.

Another aspect of the present invention is to provide a stormwater drain insert comprising: an adjustable peripheral frame; a top bib comprising water permeable fabric, an outer peripheral pocket extending around a periphery of the top bib enclosing the adjustable peripheral frame therein, and an opening inside the adjustable peripheral frame; and a sediment bag comprising water permeable fabric extending downward from the top opening of the sediment bag, wherein the top bib is movable from an extended configuration to a collapsed configuration upon adjustment of the adjustable peripheral frame, and the adjustable peripheral frame is fully contained within the outer peripheral pocket of the top bib in both the extended configuration and the collapsed configuration.

These and other aspects of the present invention will be more apparent from the following description.

BRIEF DESCRIPTION OF THE DRAWINGS

FIG. 8 is a top view of a stormwater drain insert in an expanded configuration in accordance with an embodiment of the present invention.

FIG. 9 is a top view of the stormwater drain insert of FIG. 8 in a collapsed configuration.

DETAILED DESCRIPTION

Figure 1:
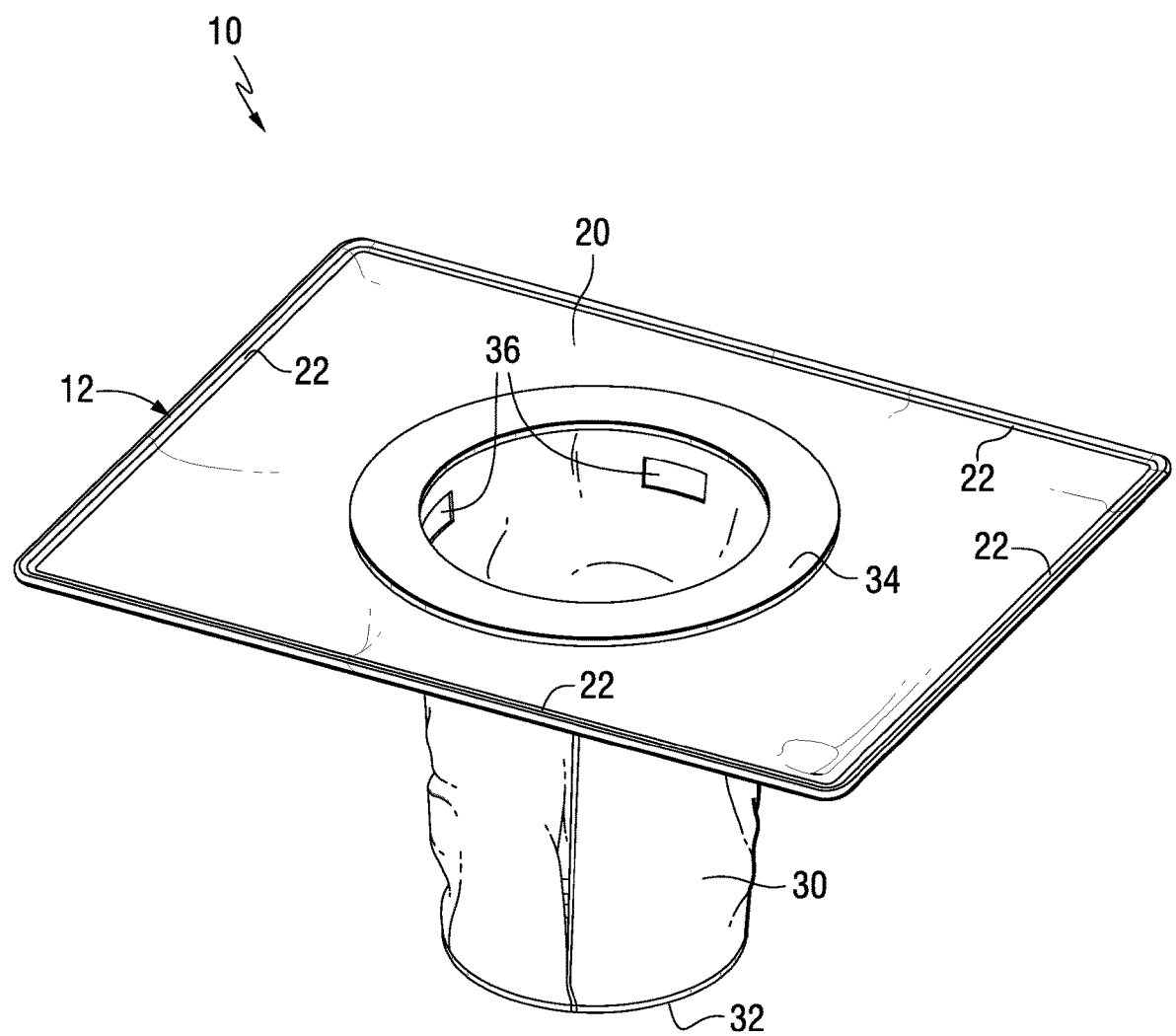
FIG. 1 is an isometric view of a stormwater drain insert in accordance with an embodiment of the present invention.
Figure 2:
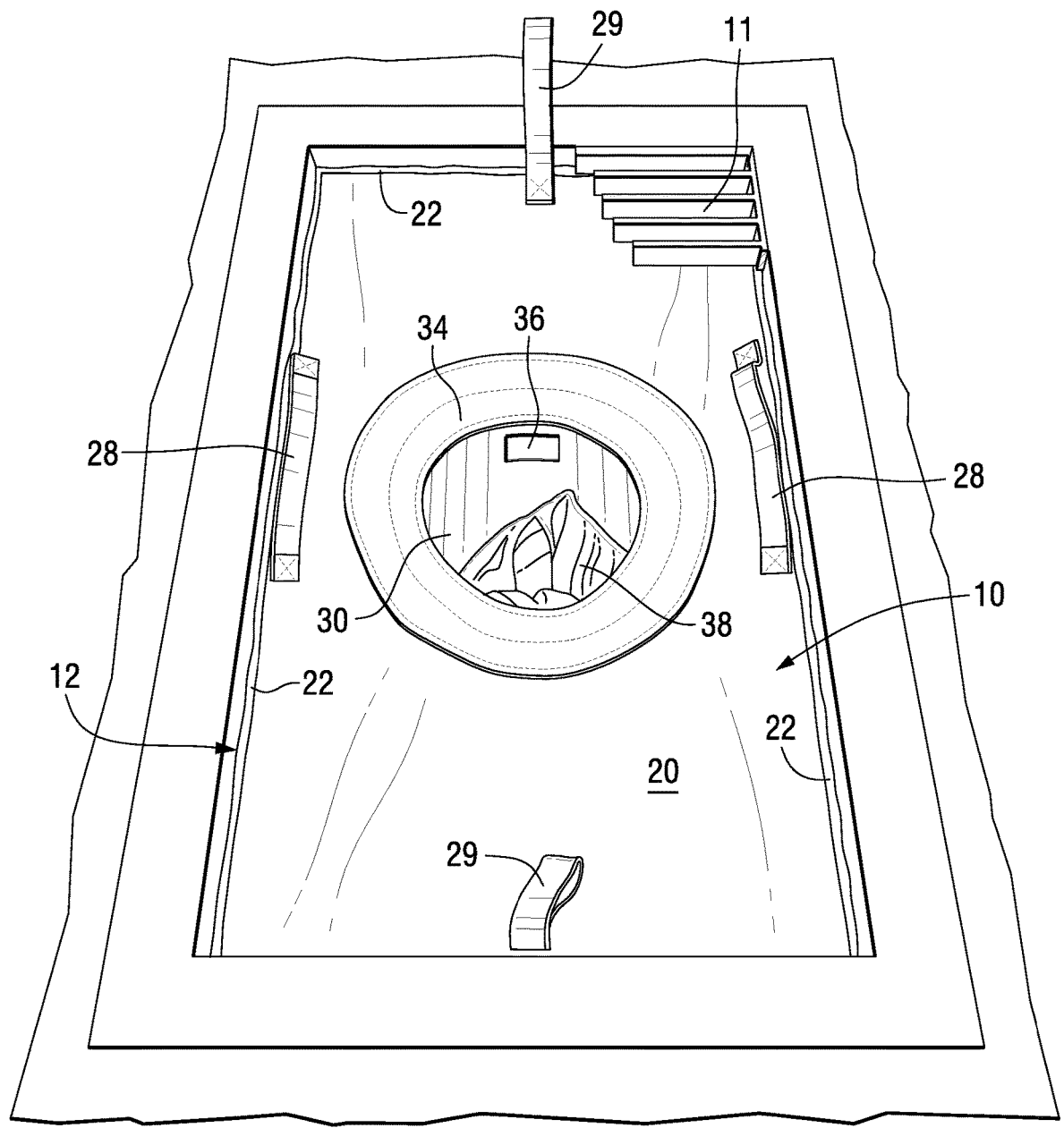
FIG. 2 is a top front perspective view of a stormwater drain insert in accordance with an embodiment of the present invention installed in a storm drain chamber under a storm drain grate.

FIGS. 1-5 illustrate a stormwater drain insert 10 in accordance with an embodiment of the present invention. The stormwater drain insert 10 includes an adjustable peripheral frame 12, a top bib 20 made of water permeable fabric, and a centrally located sediment bag 30 extending downwardly from the top bib 20. The adjustable peripheral frame 12 is contained in a continuous pocket 22 that extends around the outer peripheral edge of the top bib 20. As shown in FIG. 2, the stormwater drain insert 10 may be installed under a storm drain grate 11 within a storm drain chamber.

Figure 3:
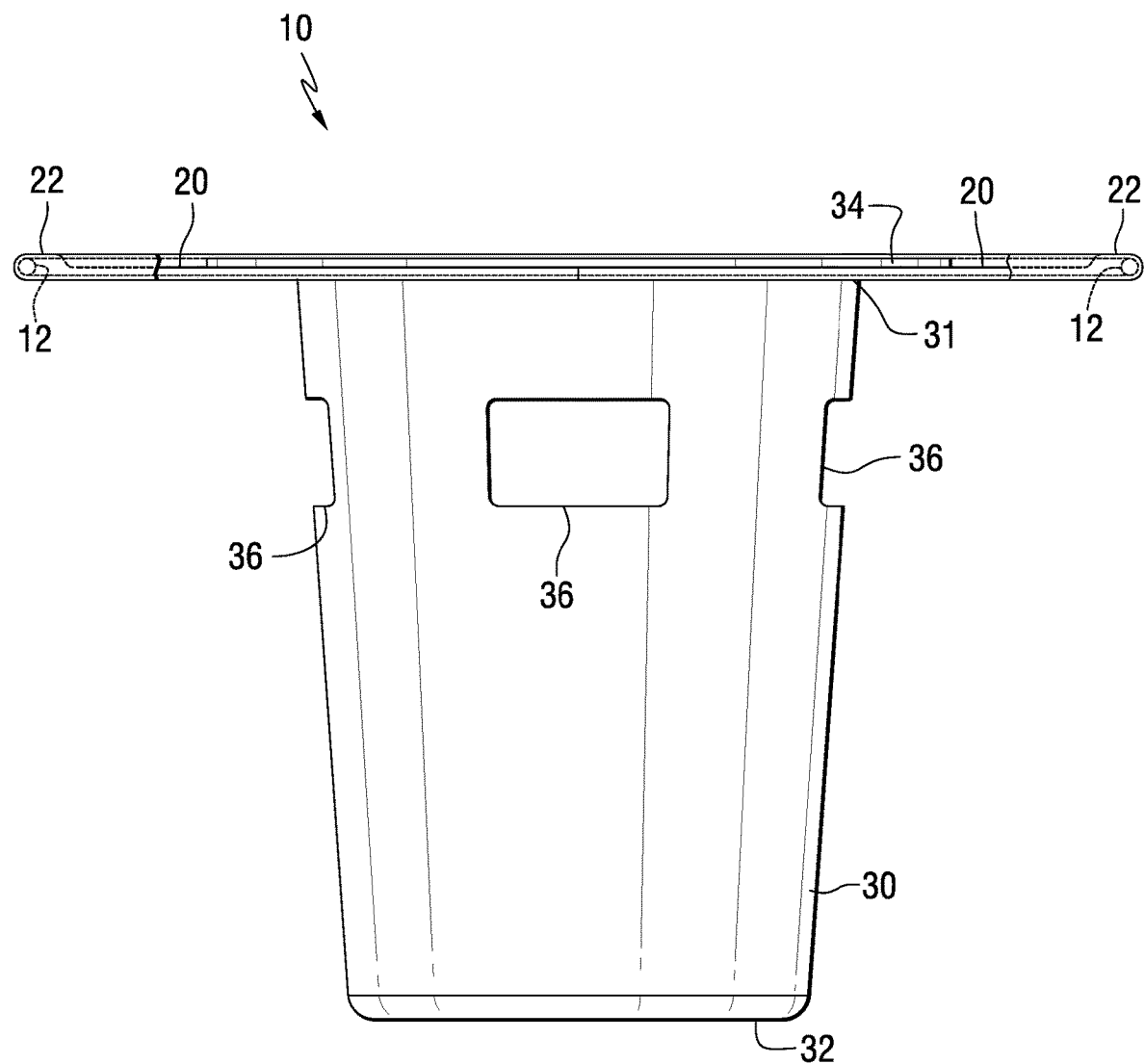
FIG. 3 is a side view of a stormwater drain insert in accordance with an embodiment of the present invention.
Figure 4:
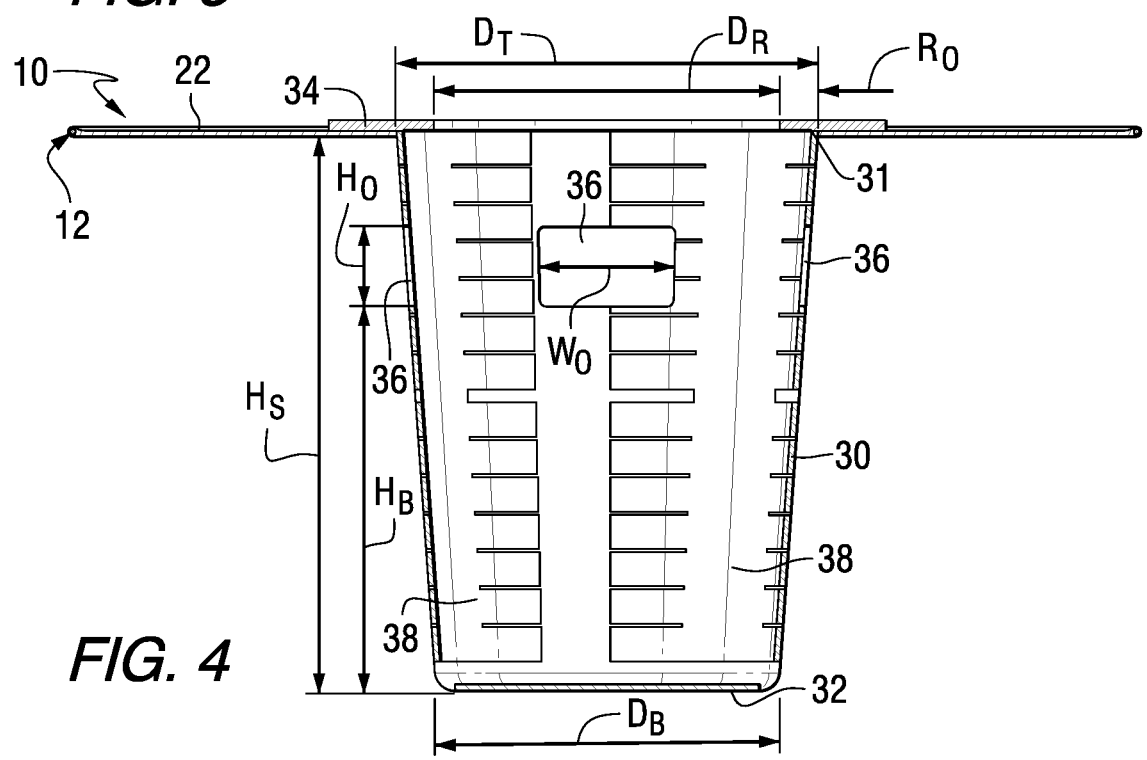
FIG. 4 is a cross-sectional side view of the stormwater drain insert of FIG. 3.

As shown most clearly in FIGS. 1, 3 and 4, the sediment bag 30 is generally cylindrical and has a top rim 31 and a bottom panel 32 or seam. In the embodiment shown, the shape of the sediment bag 30 is slightly inwardly tapered from the top rim 31 to the bottom panel 32 or seam.

As shown in FIGS. 1-5, an overhanging ring 34 is provided above the top rim 31 of the sediment bag 30 to direct the flow of water runoff, as more fully described below. Overflow ports 36 are provided through the sidewall of the sediment bag 30. In the embodiment shown, four overflow ports 36 are used. However, any other suitable member of overflow ports may be included, for example, two, three, five or more ports may be used. In certain embodiments, the total open area of all of the overflow ports 36 combined is at least 5 square inches, for example, at least 10 square inches.

Figure 5:
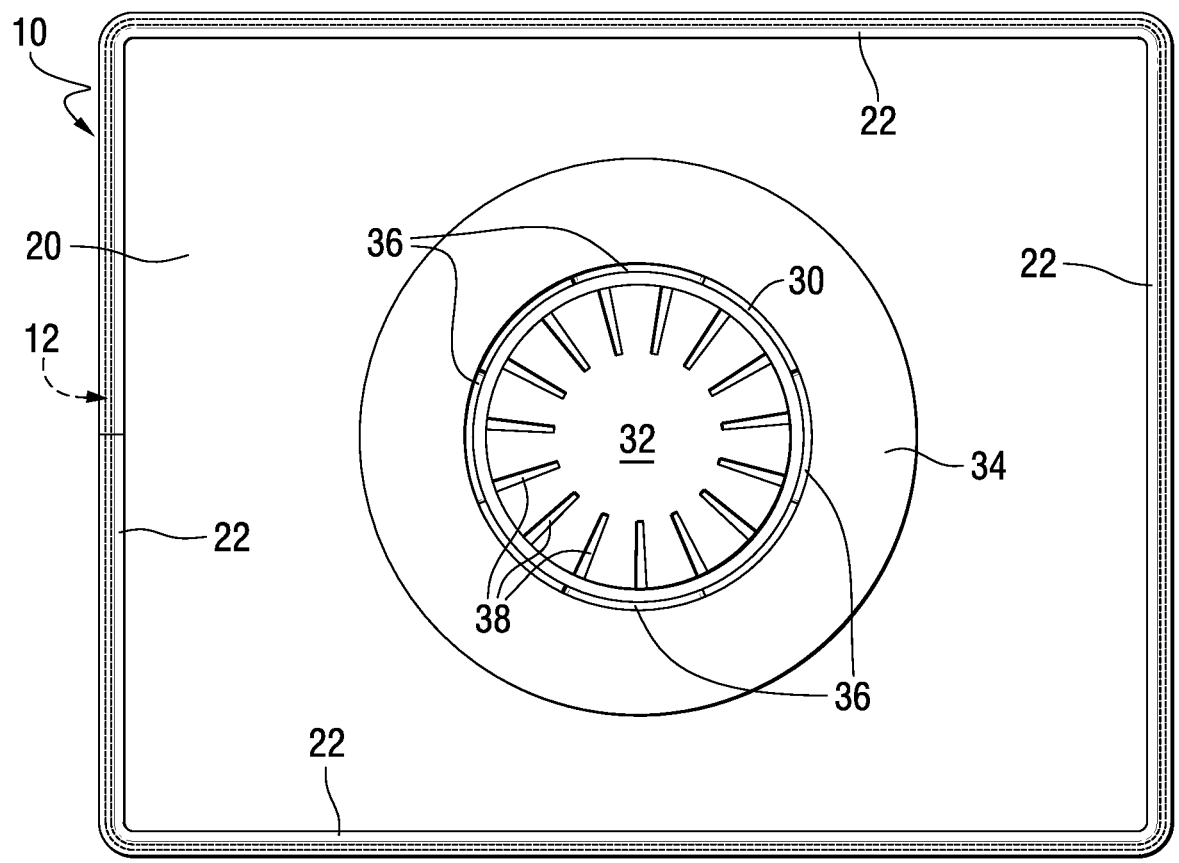
FIG. 5 is a top view of the stormwater drain insert of FIG. 3.

As shown in FIGS. 2, 4 and 5, additional fabric in the form of fingers 38 or the like may be provided inside the sediment bag 30. Such fingers 38 may be sewn inside the sediment bag 30 to increase the oil capturing capacity.

In certain embodiments, the fabric of the top bib 20, sediment bag 30, overhanging ring 34 and fabric fingers 38 comprises water permeable fabric that allows water to pass therethrough but traps sediment and other contaminants such as oils, hydrocarbons, heavy metals and the like. The fabric may be oleophilic in order to help trap oils and other hydrocarbons. For example, the oleophilic water permeable fabric of the top bib 20, sediment bag 30 and fabric fingers 38 may be composed of polypropylene having a basis weight of 8±1 ounces per square yard (osy) and a thickness of 0.1±0.033 inches. Such fabrics are flexible and foldable, and allow the stormwater drain inserts 10 to be folded substantially flat prior to use, e.g., during shipping and storage.

The oleophilic water permeable fabric of the overhanging ring 34 may be composed of a polypropylene/polyester blend having a basis weight of 11.25±1.75 ounces per square yard (osy) and a thickness of 0.185±0.05 inches.

As shown in the sectional view of FIG. 4, the sediment bag 30 has a height $H_S$ measured from the top rim 31 to the bottom panel 32. The height $H_S$ may typically range from 8 to 50 inches, for example, from 12 to 20 inches. As further shown in FIG. 4, the top rim 31 of the sediment bag 30 has a diameter $D_T$, while the bottom panel 32 or portion of the sediment bag 30 has a diameter $D_B$ when filled with sediment. The diameters $D_T$ and $D_B$ may be the same or different, e.g., $D_B$ may be slightly less than $D_T$ to provide a side taper angle of the sediment bag of from 1 to 15°. The top diameter $D_T$ may typically range from 8 to 32 inches, for example, from 10 to 16 inches. The bottom diameter $D_B$ when filled with sediment may typically range from 8 to 32 inches, for example, from 9 to 15 inches.

The overhanging ring 34 has an inner diameter $D_R$, and a ring overhang distance $R_O$ measured radially inwardly from the top rim 31. The inner diameter $D_R$ and overhang distance $R_O$ of the overhanging ring 34 are sized to overhang the opening of the top rim 31 of the sediment bag 30 from 0.5 to 3 inches, for example, by a minimum of 1 inch, preferably 2 inches. The overhanging ring 34 directs the stormwater away from the overflow ports 36 and down into the sediment bag 30. Thus, only when the stormwater flow rate is greater than the flow-through-capacity of the sediment bag 30 will stormwater pass through the overflow ports 36.

The overflow ports 36 have a height $H_O$ and width $W_O$, and a bottom edge located a distance $H_B$ above the bottom panel 32 or seam. The height $H_O$ may typically range from 1 to 9 inches, for example from 2 to 6 inches. The width $W_O$ may typically range from 3 to 8 inches, for example from 4 to 6 inches.

The widths $W_O$ of the overflow ports 36 may be measured around the circumference of the sediment bag 30. For example, each overflow port opening 36 may have a circumferential length corresponding to an angle of from 25 to 65° around the circumference of the sediment bag 30.

As shown in FIGS. 1 and 3-5, an enclosed pocket 22 is provided around the peripheral edge of the top bib 20 and contains the adjustable peripheral frame 12. As shown in FIG. 2, strap handles 28 may be provided along opposing edges of the top bib 20, and loop handles 29 may be provided on other opposing edges of the top bib 20. Such handles 28 and 29 may be made of highly visible strapping materials.

Figure 6:
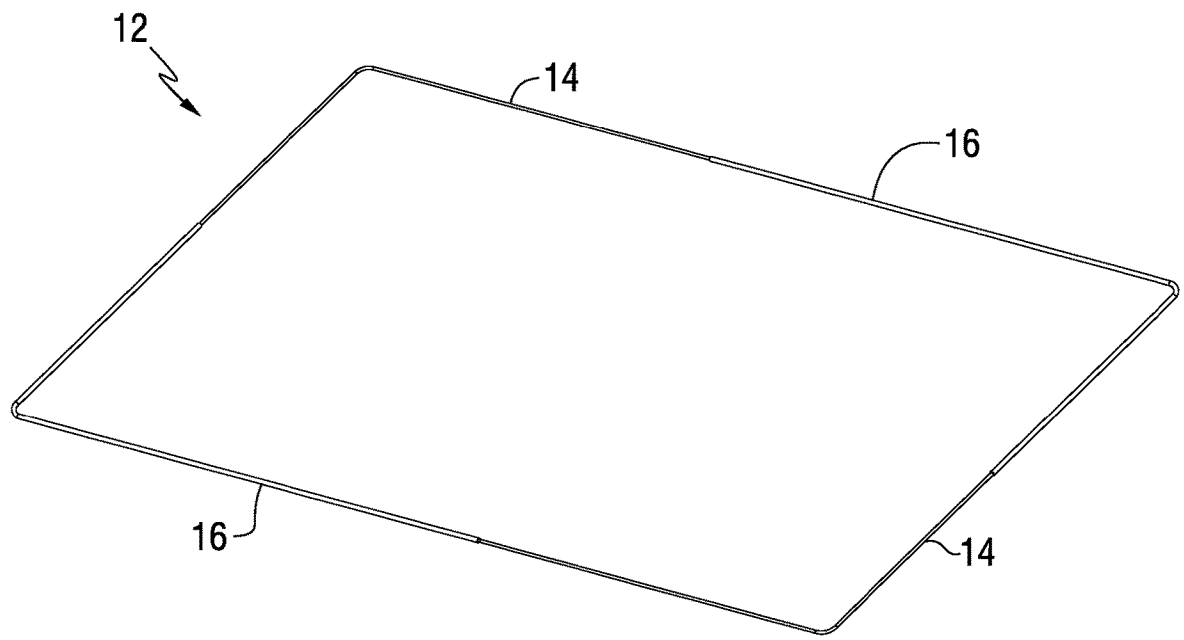
FIG. 6 is a perspective view of an adjustable frame for a stormwater drain insert in accordance with an embodiment of the present invention.
Figure 7:
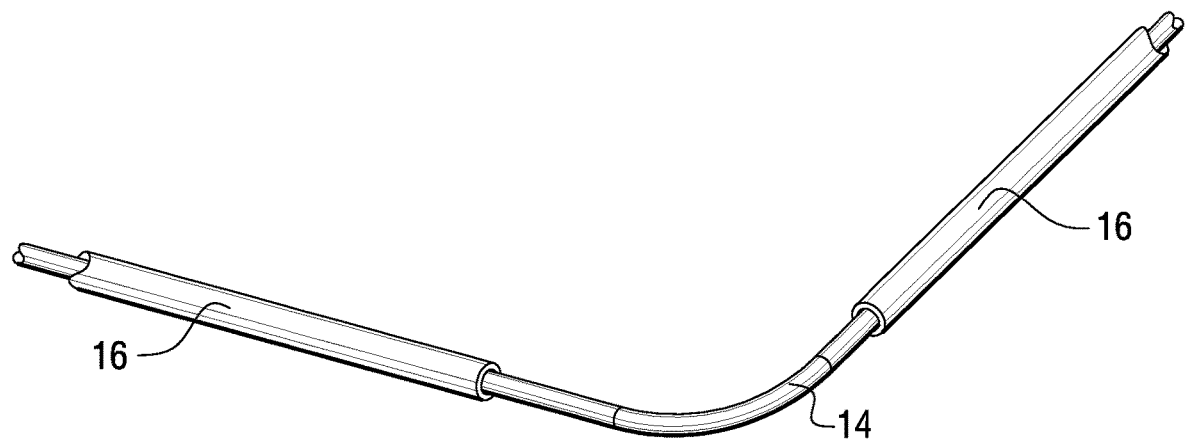
FIG. 7 is a magnified view of a portion of the adjustable frame of FIG. 6.

Details of an adjustable peripheral frame 12 in accordance with an embodiment of the present invention are shown in FIGS. 6 and 7. The adjustable peripheral frame 12 includes two inner telescoping frame rods 14 receiving two outer telescoping frame tubes 16. The telescoping action of the inner frame rods 14 and outer frame tubes 16 allows the adjustable peripheral frame 12 to extend lengthwise and widthwise in order to fit within various sizes of storm drain chambers. From a fully collapsed condition to a fully extended condition, each side of the peripheral frame 12 can almost double in size, and the area within the adjustable peripheral frame 12 may almost quadruple in size. As more fully described below, frictional engagement between the inner telescoping frame rods 14 and the outer telescoping frame tubes 16 is provided in order to reduce or prevent unwanted movement of the inner arms 14 within the outer tubes 16 during usage.

The telescoping action when adjusting to the storm drain chamber size does not cause snagging of the filter fabric of the top bib 20 and the pocket 22 that encloses the adjustable frame 12, thus eliminating the need for the edge slits in the fabric.

The inner rods 14 and outer tubes 16 may be made of any suitable material, such as stainless steel or another corrosion resistant metal, such as brass. The outer surfaces of the inner rods 14 and/or the inner surfaces of the outer tubes 16 may be provided with a rough or irregular surface in order to increase drag between the rods 14 and tubes 16. For example, the inner rods 14 may be threaded. This mitigates the issue of smooth rods that can self-retract back into the outer tubes due to the weight of collected sediment in the sediment bag. Self-retraction of the rods could cause the whole unit to fall into the storm basin when the grate is removed for servicing. Typical diameters of the inner rods 14 may be 0.25±0.06 inches, or a ¼×20 threaded rod. Typical diameters of the outer tubes 16 may be an inner diameter of 0.25±0.06 inches, and an outer diameter of 0.394±0.06 inches.

FIGS. 8 and 9 illustrate the stormwater drain insert 10 in an expanded configuration and a contracted configuration, respectively. In FIG. 8, the expanded stormwater drain insert 10 has an expanded length $L_E$ and an expanded width $W_E$. In FIG. 9, the contracted stormwater drain insert 10 has a contracted length $L_E$ and a contracted width $W_C$. The length $L_C$ in the most contracted configuration may approach 50 percent of the expanded length $L_E$, e.g., about 55 or 60 percent. The width $W_C$ in the most contracted configuration may approach 50 percent of the expanded width $W_E$, e.g., about 55 or 60 percent. The stormwater drain insert 10 may thus be adjusted in size to cover drain chamber areas of significantly different sizes. Due to the fact that the adjustable peripheral frame 12 is fully contained within the pocket 22 surrounding the top bib 20, unwanted escape of untreated stormwater runoff is reduced or eliminated. Thus, as shown in FIGS. 8 and 9, in both the expanded and contracted configurations, no slits or openings are provided in the periphery or elsewhere in the top bib 20 that could otherwise allow untreated water runoff to escape through such slits or openings.

As used herein, "including," "containing" and like terms are understood in the context of this application to be synonymous with "comprising" and are therefore open-ended and do not exclude the presence of additional undescribed or unrecited elements, materials, phases or method steps. As used herein, "consisting of" is understood in the context of this application to exclude the presence of any unspecified element, material, phase or method step. As used herein, "consisting essentially of" is understood in the context of this application to include the specified elements, materials, phases, or method steps, where applicable, and to also include any unspecified elements, materials, phases, or method steps that do not materially affect the basic or novel characteristics of the invention.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. In this application and the appended claims, the articles "a," "an," and "the" include plural referents unless expressly and unequivocally limited to one referent.

Whereas particular embodiments of this invention have been described above for purposes of illustration, it will be evident to those skilled in the art that numerous variations of the details of the present invention may be made without departing from the invention as defined in the appended claims.

What is claimed is:

1. A stormwater drain insert comprising:
    a peripheral frame;
        a top bib comprising water permeable fabric, an outer peripheral edge supported by the peripheral frame, and an opening inside the peripheral frame;
        a sediment bag comprising water permeable fabric extending downward from the top bib and having a top rim adjacent to the opening of the top bib;
        an overhanging ring extending from the top bib laterally inward from the top rim of the sediment bag defining an overhang distance; and
        at least one overflow port in a sidewall of the sediment bag located vertically below the overhanging ring.

2. The stormwater drain of claim 1, wherein the overhanging ring comprises fabric.

3. The stormwater drain of claim 2, wherein the fabric of the overhanging ring is water permeable and oleophilic.

4. The stormwater drain of claim 1, wherein the overhang distance of the overhanging ring is from 0.5 to 3 inches.

5. The stormwater drain of claim 1, wherein the overhanging ring has an inner diameter $D_R$, the top rim of the sediment bag has a diameter $D_T$, and the ratio of $D_T:D_R$ is from 1.05:1 to 1.2:1.

6. The stormwater drain of claim 1, wherein the water permeable fabrics of the top bib and sediment bag are oleophilic.

7. The stormwater drain of claim 1, further comprising fingers of water permeable oleophilic material attached inside the sediment bag.

8. The stormwater drain of claim 1, comprising at least two of the overflow ports,
    wherein each overflow port has a height $H_O$ that is less than 30 percent of a height $H_S$ of the sediment bag, and each sediment port has width Ws measured around a circumference of the sediment bag that is from 1 to 30 percent of the circumference of the sediment bag.

9. The stormwater drain of claim 8, wherein each overflow port has a lower edge located at a height $H_B$ above a bottom panel of the sediment bag, the sediment bag has a height $H_S$ measured from the bottom panel to the top rim, and the ratio of $H_S:H_B$ is from 1.1:1 to 1.3:1.

10. The stormwater drain of claim 1, wherein the peripheral frame is adjustable.

11. The stormwater drain of claim 10, wherein the adjustable peripheral frame comprises first and second substantially L-shaped outer frame tubes, a first substantially L shaped inner frame rod having one end telescopingly engaged within a first end of the first outer frame tube and an opposite end telescopingly engaged within a first end of the second outer frame tube, and a second substantially L-shaped inner frame rod having one end telescopingly engaged within a second end of the first outer frame tube and an opposite end telescopingly engaged with a second end of the second outer frame tube.

12. The stormwater drain of claim 11, wherein the first and second inner frame rods are frictionally engaged within the first and second outer frame tubes to thereby provide resistance to relative movement between the first and second inner frame rods and the first and second outer frame tubes.

13. The stormwater drain of claim 10, wherein the outer peripheral edge of the top bib comprises a closed pocket extending around the entire peripheral edge, and the adjustable peripheral frame is entirely contained in the closed pocket.

* * * * *